United States Patent [19]

Parker

[11] Patent Number: 5,427,183
[45] Date of Patent: Jun. 27, 1995

[54] DEEP TILLAGE STANDARD AND BRACKET THEREFOR

[75] Inventor: Paul D. Parker, Ankeny, Iowa

[73] Assignee: Deere & Company, Moline, Ill.

[21] Appl. No.: 159,991

[22] Filed: Nov. 30, 1993

[51] Int. Cl.⁶ .............................................. A01B 61/04
[52] U.S. Cl. ........................................ 172/265; 172/264
[58] Field of Search ................ 172/261, 264, 265, 705, 172/707, 708, 710, 643; 248/903, 916

[56] References Cited

U.S. PATENT DOCUMENTS

| | | | |
|---|---|---|---|
| 2,906,353 | 9/1959 | Rogers | 172/265 |
| 3,049,181 | 8/1962 | Oerman et al. | 172/264 |
| 3,098,529 | 7/1963 | Wade et al. | 172/265 |
| 4,032,096 | 6/1977 | Perrault et al. | 248/903 |
| 4,078,615 | 3/1978 | Kelley | 172/711 |
| 4,463,813 | 7/1984 | Long et al. | |
| 4,530,406 | 7/1985 | Hake et al. | |
| 4,548,277 | 10/1985 | Dietrich, Sr. et al. | |
| 5,165,486 | 11/1992 | Davidson | 172/705 |

FOREIGN PATENT DOCUMENTS 635406  1/1962  Canada .................. 172/264

Primary Examiner—Randolph A. Reese
Assistant Examiner—Spencer Warnick

[57] ABSTRACT

A double spring reset standard and spring bracket therefor particularly useful for intermediate tillage operations at depths of approximately 13 inches wherein high average draft loads are in the range of 2000 pounds. The moment arm that the springs must resist to keep the standard from tripping during normal operation is minimized by bringing the draft force line closer to the standard pivot. The spring bracket which must be able to resist extremely high torsional stresses is fabricated from 0.375 inch thick metal blanks in a single cold die operation and includes offsets and specially designed edge flanges to reduce edge stresses at the offset bends.

18 Claims, 3 Drawing Sheets

DEEP TILLAGE STANDARD AND BRACKET THEREFOR

BACKGROUND OF INVENTION

1. Field of Invention

The present invention relates generally to agricultural tillage tools, and, more specifically, to an improved spring trip standard and bracket assembly for deep tillage applications where operating depths are less than that of typical ripper standards but greater than that of conventional field cultivator standards.

2. Related Art

Spring trip or spring cushion standard assemblies such as shown in U.S. Pat. No. 4,463,813 utilizing a single spring provide a cost effective arrangement and an advantageous trip/reset curve with a relatively high initial trip force for stability and elimination of unwanted tripping. U.S. Pat. No. 4,530,406 shows another example of a single spring standard assembly. However, some applications require standards to operate at depths less than that of typical ripper standards but greater than that of conventional field cultivator or chisel plow spring trip standards. Many of the standards have insufficient initial trip force to operate effectively at such depths, which may be as great as 13 inches. The standards must be able to trip at least as high as operating depth to clear obstacles so that trip height cannot be sacrificed in the design to achieve high initial trip force. A toggle trip design, which has the advantage of requiring less total energy for a given trip load/trip height, is often utilized with deep tillage standards. The disadvantage is that the reset force drops off considerably just after the toggle trips, which is not generally desirable. However, when designing standards with large trip loads and trip height requirements, the toggle trip was often the only practical solution.

To keep the required spring energy to a workable range in a spring trip standard, the trip load or the trip height must be minimized. The trip height requirement is driven by operating depth and therefore cannot be reduced. Therefore, the trip load must be minimized. Trip load is traditionally measured as a horizontal force at the tool tip or attaching point, which is satisfactory when analyzing loads resulting from the striking a solid obstacle. However, under normal operating conditions, the draft load has some vertical component which affects the overall resultant line of draft.

Increasing the initial trip force of a spring trip standard can be achieved by moving the tool attaching end rearwardly relative to the standard attaching pivot so that the resultant line of draft moves closer to the pivot, thereby reducing the resultant moment generated by draft force. The amount that the tool attaching end can be moved rearwardly, however, is limited by frame design considerations. If the standards are lengthened too much, they will not fit into the space allotted on the frame.

Increased spring energy can also be used to increase initial trip force of a spring trip standard. A single spring standard design, however, fails to provide sufficient increasing reset force for the first part of the trip cycle with sufficient resistance to avoid tripping when no obstacle is encountered. High torsional loads on the standard spring bracket develop when two springs are mounted side by side. An offset bracket with bends has to be used to accommodate the added width of a second spring, and whenever an offset part is loaded generally parallel with the offset bend lines, a twisting action is established. The torsional loads cause high stresses along the outer edges of the bracket in the area of the bends. The bracket can be made thicker to withstand these stresses, but such a thick component becomes expensive and impractical to manufacture.

A standard designed for intermediate operation down to a depth of about 13 inches should be able to lift and shatter soil in the manner of a typical parabolic ripper standard. The ripper standards, although having the desired shape, are heavier and more expensive than required for such intermediate tillage operations.

BRIEF SUMMARY OF THE INVENTION

It is therefore an object of the present invention to provide an improved reset standard for use in intermediate tillage depth operations. It is another object to provide such a standard which overcomes most or all of the above-listed disadvantages.

It is a further object to provide an improved reset standard capable of operating to depths of about 13 inches and having a trip height of at least the operating depth. It is another object to provide such a standard having the main advantages of parabolic ripper standards and spring reset standards in a cost-effective spring trip package.

It is another object to provide an improved reset standard having a high initial trip force and a high trip height. It is a further object to provide such a standard with increasing trip force for approximately the first half of the trip cycle and with a high enough initial trip resistance to avoid tripping, even at depths of up to about 13 inches, unless an obstacle is encountered.

It is a further object to provide an improved mounting bracket for the springs of a reset standard. It is another object to provide such a bracket which can withstand the added torsional stresses of springs placed side by side to achieve the desired trip/reset force characteristics in a spring trip standard used for intermediate depth tillage operations.

A double spring reset standard and spring bracket therefor are provided that are particularly useful for intermediate tillage operations at depths of approximately 13 inches wherein high average draft loads are in the range of 2000 pounds. The moment arm that the springs must resist to keep the standard from tripping during normal operation is minimized by bringing the draft force line closer to the standard pivot. The spring bracket which must be able to resist extremely high torsional stresses is fabricated from 0.375 inch or less thick metal blanks in a single cold die operation and includes offsets and specially designed edge flanges to reduce edge stresses at the offset bends. A horizontal trip load curve is defined that provides high initial trip force, with the maximum trip force increasing to less than 150% of the initial trip force at an intermediate trip height. At the maximum tripped position, the trip load remains greater than about 1000 pounds. Therefore, the structure provide positive reentry of the tool after an obstacle is cleared without transferring excessive forces to the implement frame. The standard and bracket provide a cost effective design with excellent trip characteristics for good intermediate depth operations.

DESCRIPTION OF THE PREFERRED EMBODIMENT

Figure 1:
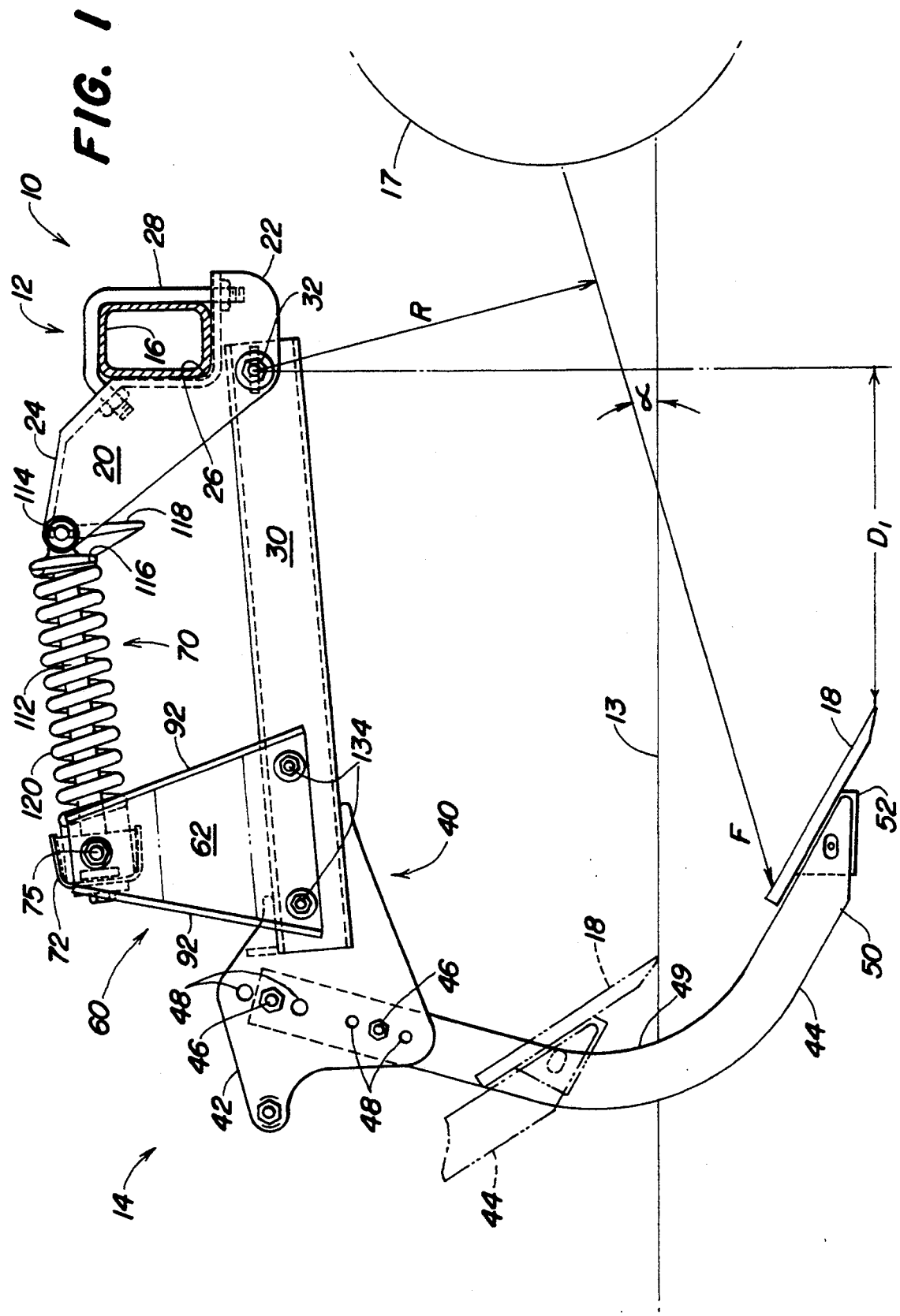
FIG. 1 is a side view of a tool frame supporting the spring trip standard assembly of the present invention.

Referring to FIG. 1, therein is shown a portion of an implement 10 with a main frame 12 adapted to be towed forwardly over the surface 13 of the ground by a tractor or other towing vehicle (not shown). Preferably, the implement 10 is a disc tiller or similar tillage implement with a plurality of spring trip standard assemblies 14 spaced on one or more generally transverse beams 16 of the frame 12. Disc gangs 17 are located forwardly and rearwardly of the standard assemblies 14.

Figure 6:
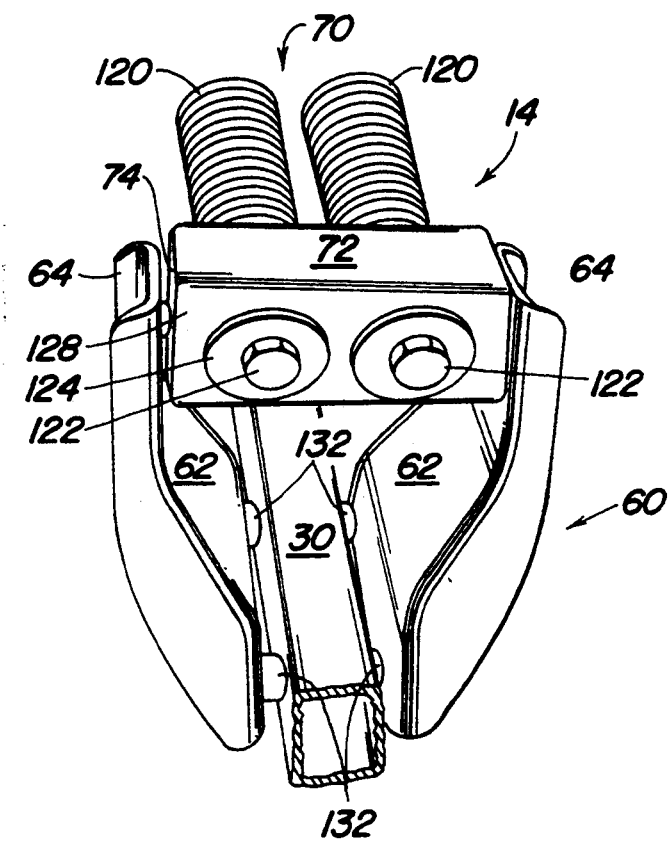
FIG. 6 is a perspective view taken from the rear of the spring trip standard assembly of FIG. 1.

As best seen in FIGS. 1 and 6, the spring trip standard assembly 14 includes a mounting bracket 20 which is generally channel-shaped and includes a bottom portion 22 which opens downwardly and an upper, rear portion 24 which opens in the rearward direction. A right angled notch portion 26 abuts against the rear and bottom faces of the main frame beam 16 and is secured thereto by a double bolt assembly 28. A standard tube or drawbar 30 of rectangular cross section includes a forward end pivotally connected for rocking about a transverse axis to the bottom portion 22 of the bracket 20 by a pin and bushing assembly or pivot 32. Mounting structure 40 having a pair of transversely spaced plates 42 is welded to the aft end of the tube 30. An edge-bent shank 44 includes an upper apertured end secured by bolts 46 between the plates 42 of the structure 40. A series of spaced apertures 48 are provided in the mounting plate structure 40 and/or the upper end of the shank 44 for vertical adjustment of the shank. In the working position of the standard assembly shown in FIG. 1, the upper portion of the shank 44 extends generally in a straight line downwardly and slightly rearwardly to a center curved section 49 which terminates in a lower, forwardly projecting tool-supporting end 50.

The earth-working tool 18 includes mounting structure 52 for securing the tool to the end 50 so that the soil-working surface of the tool 18 has substantially upwardly and forwardly directed components. Preferably, the shape of the edge-bent shank 44 conforms to parabolic-shaped ripper standard which lifts and shatters soil. However, the shank 44 is secured to the mounting plate structure 40 such that maximum operating depth will be on the order of 13 inches rather than the deeper depths of the conventional ripper standard. Such intermediate depth operation results in large draft loads, with upper average draft loads in the range of 2000 pounds.

The assembly 14, which is drawn substantially to scale in FIG. 1, incldes a rear bracket assembly 60 having a pair of formed mounting plates or side members 62 bolted to the aft end of the tube 30 and extending upwardly and outwardly therefrom to pivot receiving ends 64. A double spring assembly 70 is pivotally connected to the upper end 24 of the mounting bracket 20 and extends rearwardly therefrom to a rear saddle bracket 72 pivotally connected to the upper ends 64 of the plates 62. The saddle bracket 72 is generally channel-shaped and opens in the forward direction. Ends 74 (FIG. 6) extend forwardly from the back wall to close the sides of the saddle bracket 72 and provide pivot mounting structure 75 for connecting the bracket 72 to the ends 64 for rocking about a transverse axis. The pivot structure 75 is offset a substantial distance above the tube 30 and supports the spring assembly 70 generally parallel to the tube when the standard is in the field-working position shown in FIG. 1. As the standard trips towards a maximum tripped position (broken lines in FIG. 1), the angle of the spring assembly 70 with respect to the tube 30 changes along with the effective moment arm through which the spring force operates.

The double spring assembly 70, which will be described in further detail below is capable of generating a force of over 10,000 pounds and preferably up to approximately 11,700 pounds. As can best be appreciated from FIG. 6, the width of the standard tube 30 is substantially less than the width of the double spring assembly 70 and therefore the bracket assembly 60 must be able to withstand extremely high stresses caused by torsion. The bracket assembly 60 could be made with very thick, flat pieces of stock material, but such material is difficult to form and high stressed are created along the edges of such material during torsional loading. Reinforcements could also be welded to thinner stock material, but welding significantly increases the cost of the part.

Figure 2:
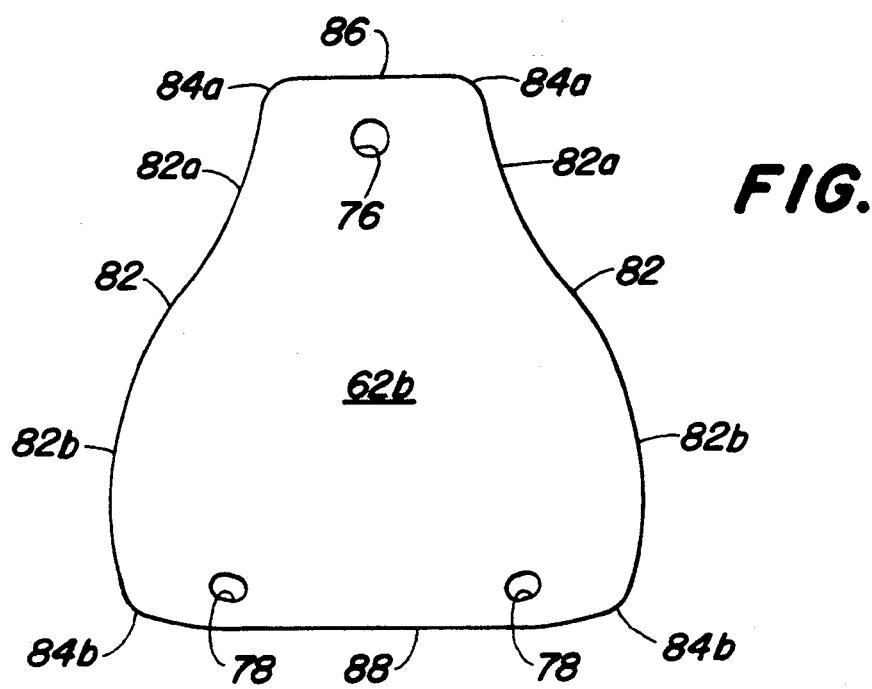
FIG. 2 is a plan view of the metal blank for the spring support utilized with the assembly of FIG. 1.
Figure 4:
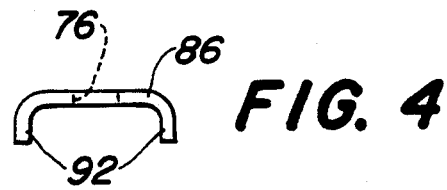
FIG. 4 is a projection of the top edge of the support of FIG. 3.

Since the maximum loads and direction of the loading are well defined, finite element analysis was used to design the bracket assembly 60. It was found by detailed analysis that a special stiffening rib along the outer edges of the plates 62 significantly reduces edge stresses. Preferably, a flat piece of A13R stock material is laser or die cut into a blank 62B (FIG. 2) with a gradually varying width. A circular upper pivot aperture 76 is formed at the top of the blank 62B, and two slightly elongate apertures 78 are provided at the bottom of the blank. The blank 62B has curved side edges 82 which are concave in the outward direction at areas 82a near the narrow upper end and convex in the outward direction at areas 82b near the wider lower portion. The side edges 82 are joined by rounded corners 84a and 84b at the top and bottom of the blank 62B to upper and lower edges 86 and 88, respectively. The blank 62B is symmetrical about an upright centerline passing through the aperture 76, and the formed plates 62 are identical for the left and right sides of the tube 30. The blank is shown substantially to scale in FIG. 2.

Figure 5:
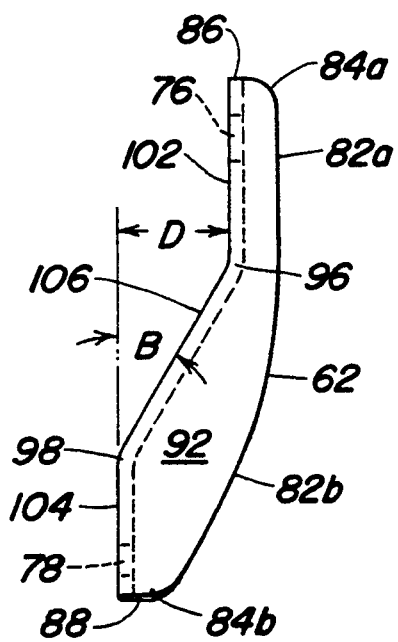
FIG. 5 is a rear view of the support of FIG. 3.
Figure 3:
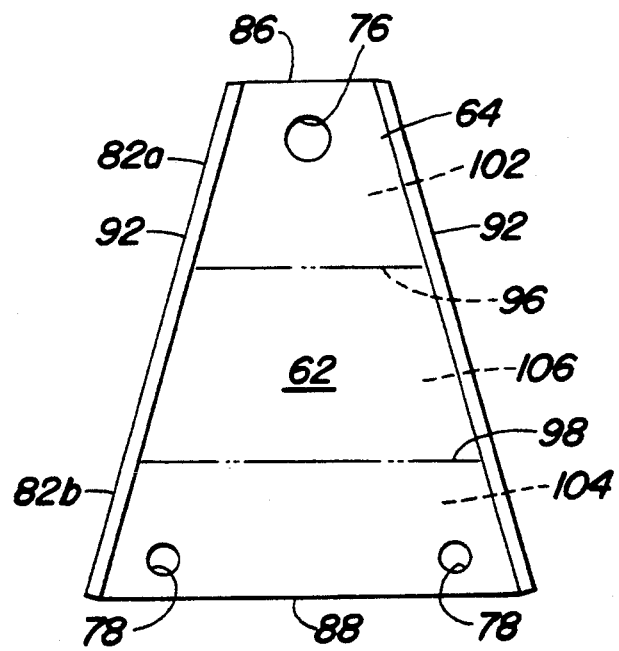
FIG. 3 is a side view of the formed spring support.

The bracket plate 62 is cold formed from the blank 62B (FIG. 2) in a single operation using a die set. Stiffening ribs or flanges 92, and an offset (see D of FIG. 5) between upper and lower bend locations indicated generally at 96 and 98, are formed at the same time in the die set. The upper bend location 96 passes through the edges 82 near the transition area between the concave and convex areas 82a and 82B. The lower bend location 98 passes through the edge areas 82b slightly below the widest portion of the blank 62B. The stiffening ribs 92 are bent at a substantially a right angle to the plane of the remainder of the plate 62B and, as best seen in FIGS. 1 and 3, lie generally along upwardly converging planes which are perpendicular to the plane of the drawing page so that the ribs 92 appear straight in the side view. Upper and lower planar surface areas 102 and 104 joined by an angled planar surface 106 are defined, with the surfaces 102 and 104 being parallel to each other, and the surface 106 forming an angle beta (FIG. 5) of approximately 30 degrees with the surface 104. An offset D on the order of 2.9 inches is thus defined to accommodate the width of the double spring assembly 70. After forming, the holes 78 that were slightly elongate in the blank 62B are essentially round.

The double spring assembly 70 includes a pair of spring support or retaining structures 112 generally of the type shown and described in the aforementioned U.S. Pat. No. 4,463,813. Each of the structures 112 includes a forward end 116 with an integral stop 118. The forward end 116 is pivotally connected to the upper end 24 of the mounting bracket 20 by a pivot pin assembly 114 located rearwardly of and above the pivot 32. A coil spring 120 is supported on each structure 112 and is compressed between the end 116 and the back wall of the saddle bracket 72. The two springs 120 can provide a total force of over 10,000 pounds and preferably a force as high as 11,700 pounds. The aft end of each structure 112 includes an internally threaded portion and a bolt 122 (FIG. 6) inserted through a washer 124 and an aperture in back side of the bracket 72. The bolt 122 is threaded into the aft end to compress the spring 120 between the bracket 72 and the forward end 116. The bolts 122 limit downward rocking of the shank 48 to the lowermost position shown in FIG. 1. If further details of the retaining structures 112 are desired, reference may be had to the aforementioned U.S. Pat. No 4,463,813.

To provide a hard joint between the bracket plates 62 and the tube 30, bushings 132 (FIG. 6) which pass through and are welded to the tube 30 receive bolts 134. The bolts tightly secure the plates 62 against the opposite ends of the bushings 132.

The horizontal offset between the tool 18 and the pivot 32 (D1 of FIG. 1) is increased over conventional spring trip standards and, as shown in FIG. 1, is substantially greater than 15 inches and preferably approximately 18 inches. This relatively large offset D1 provides a lower effective moment arm (R, with R preferably being less than approximately 20 inches) through which the resultant draft force (F) operates to urge the shank in the counterclockwise direction about the pivot 32. For the shank geometry shown in FIG. 1, a horizontal trip load of about 2300 pounds through the mounting hole of the tool 18 results in the same moment about the standard pivot 32 as a resultant draft force of over approximately 4100 pounds (with the resultant draft at an angle α of greater than 15 degrees—preferably about 17 degrees—and intersecting the shank about 6 inches above the point of the tool 18). Since the high value for average draft is around 2000 pounds for the type of standard and point shown in FIG. 1 operating at about a 13 inch depth, the above design criteria allows peak forces of two times the average without tripping.

Figure 7:
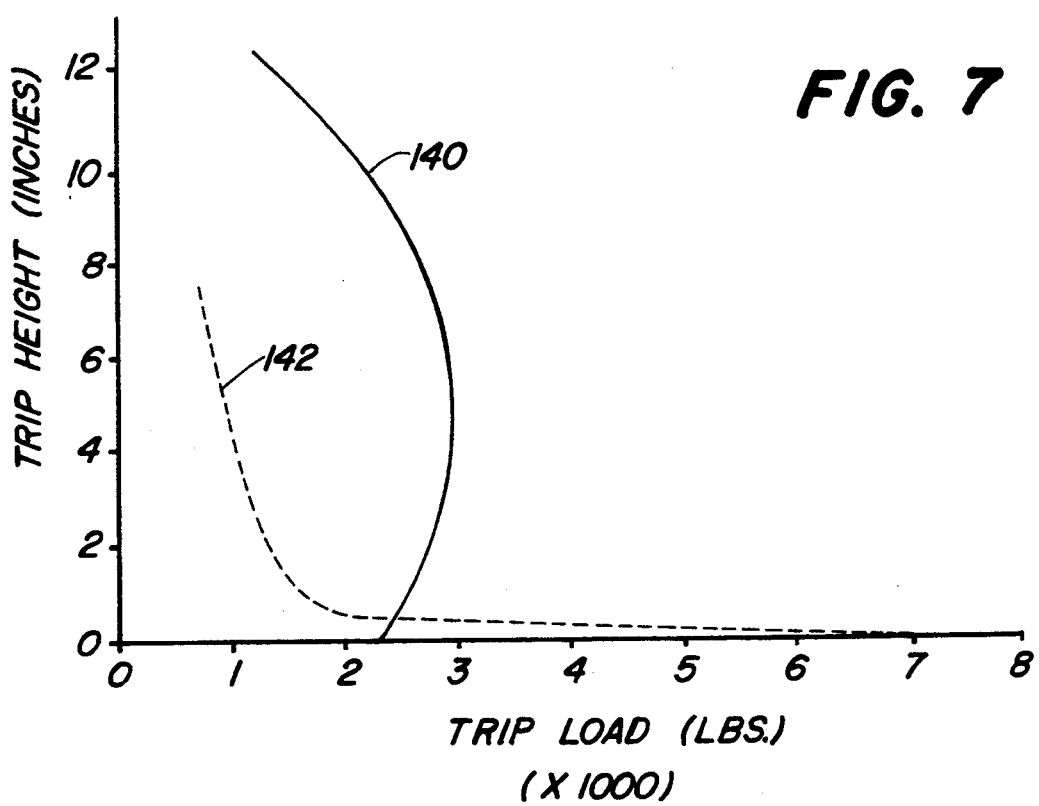
FIG. 7 is a graph of the trip force curve for the assembly shown in FIG. 1 and for a prior art toggle type assembly.

As the standard trips, the effective moment arm through which the force F acts to rotate the assembly about the pivot 32 decreases. The effective moment arm through which the springs 120 operate to rotate the assembly in the opposite direction about the pivot decreases as the spring force increases. As best seen in the force curve 140 of FIG. 7, no rotation of the shank upwardly takes place until an initial horizontal trip load of about 2300 pounds is encountered. The trip load gradually increases to a maximum load of about 3000 pounds when the trip height approaches approximately 35–40% of the maximum trip height (about 5 inches for the structure shown in FIG. 1.) Thereafter, the decreasing spring moment arm causes the trip load to decrease towards the initial trip load at a trip height of approximately 75% the maximum (slightly less than 10 inches). The trip load thereafter decreases to a minimum of slightly greater than half the initial trip load at the maximum trip height near 13 inches. The stop 118 contacts the tube 30 at the maximum tripped position to prevent the standard from tripping to an over-center position.

For comparison, a conventional toggle trip standard force curve 142 is shown. After a very high initial trip load of between 6000 and 7000 pound is encountered, trip load immediately falls off to less than 2000 pounds and quickly drops to less than 1000 pounds at about a 5 inch trip height. The trip load curve 140 provided by the structure of FIG. 1 achieves good trip resistance for high average draft loads while limiting the maximum load the frame 12 must carry during tripping. A strong reset force is retained, even at the maximum tripped position, for positive reentry of the tool to the working depth after an obstacle is cleared. Minimizing the moment arm R by moving the tool 18 rearwardly to increase the distance D1 reduces the trip load and the amount of spring force required for an effective trip cycle.

Having described the preferred embodiment, it will be apparent that modifications can be made without departing from the scope of the invention as set forth in the accompanying claims.

We claim:

1. In an implement having a frame adapted for forward movement over a field, a standard for mounting on the implement frame for intermediate tillage depth operations as deep as approximately thirteen inches, the standard comprising:

a support bracket adapted for connection to the frame, the support bracket having a lower end and an upper, rearwardly projecting end;

drawbar structure pivotally connected to the lower end of the bracket for rocking about a drawbar axis transverse to the forward direction, the drawbar structure extending rearwardly from the axis to an aft end, and including a tool support connected to the aft end and extending downwardly to a lower tool supporting end;

an earth working tool connected to the tool supporting end and having a forwardly directed soil contacting face with a forward most soil engaging end and a substantial upwardly facing component to define a load force acting along a load force line which is angled upwardly in the forward direction during field-working operations;

rear bracket structure connected near the aft end and projecting above the drawbar structure, the rear bracket structure comprising a pair of upright side members;

a fore-and-aft extending spring assembly pivotally connected near its aft end to the side members for rocking about a first assembly axis, and near its forward end to the upper rearwardly projecting end of the support bracket for rocking about a second assembly axis located above and rearwardly of the drawbar axis, the spring assembly including a pair of compression springs and a spring keeper structure for limiting downward rocking of the drawbar structure to a lowermost field-working position while facilitating upward rocking of the drawbar structure to a maximum tripped position wherein the tool is at least approximately thirteen inches above the field-working position, wherein the compression springs provide a maximum combined spring force of over 10,000 pounds acting to resist upward rocking of the tool supporting end from the field-working position, the spring force acting through an effective moment arm to prevent substantial upward rocking of the drawbar structure from the field-working position below a horizontal initial trip load force of approximately 2000 pounds at the tool.

2. The invention as set forth in claim 1 wherein the effective moment arm and spring force provide a maximum trip load near a partially tripped position of the drawbar structure which is approximately half the distance between the maximum tripped position and the lowermost field-working position.

3. The invention as set forth in claim 2 wherein the maximum trip load is substantially less than 150% of the initial trip horizontal load force.

4. The invention as set forth in claim 3 wherein the trip load force at the maximum tripped position is greater than 1000 pounds but substantially less than the horizontal initial trip load force.

5. The invention as set forth in claim 1 wherein in the field-working position the tool has a leading edge that is located rearwardly of the forward drawbar pivot a distance greater than fifteen inches.

6. The invention as set forth in claim 5 wherein the load force line extends upwardly in the forward direction from the tool at an angle of greater than approximately 15 degrees.

7. The invention as set forth in claim 6 wherein the load force line is offset less than approximately 20 inches from the drawbar axis.

8. The invention as set forth in claim 5 wherein the spring assembly is substantially parallel to the drawbar structure in the field-working position.

9. The invention as set forth in claim 1 wherein the standard includes a forwardly directed leading surface having a parabolic shape for lifting and breaking soil.

10. The invention as set forth in claim 1 wherein the side members comprise a plate formed from metal of thickness of approximately 0.375 inch or less and including forward and rearward edges, wherein a stiffening rib is formed along the forward and rearward edges.

11. The invention as set forth in claim 10 wherein the plate includes central planar sections with offset bend locations, and wherein the stiffening ribs extend perpendicularly to the planar sections.

12. The invention as set forth in claim 11 wherein the plate is cold formed from a flat metal blank, the blank including upper outwardly concave and lower outwardly convex edges and wherein one of the bend locations is located adjacent a transition area between the concave and convex edges.

13. The invention as set forth in claim 12 wherein a second bend location is located adjacent the widest area of the blank between the outwardly convex edges.

14. The invention as set forth in claim 12 wherein a second bend location is located adjacent the widest area of the blank between the outwardly convex edges.

15. In an implement having a frame adapted for forward movement over a field, a standard for mounting on the implement frame for intermediate tillage depth operations, the standard comprising:

a support bracket adapted for connection to the frame, the support bracket having a lower end and an upper, rearwardly projecting end;

a drawback pivotally connected to the lower end of the bracket for rocking about an axis transverse to the forward direction, the drawbar extending rearwardly from the axis to an aft end having a preselected width, and including a tool support connected to the aft end and extending downwardly to a lower tool supporting end;

an earth working tool connected to the tool supporting end;

a fore-and-aft extending spring assembly pivotally connected near its forward end to the upper rearwardly projecting end of the support bracket, the spring assembly having a width substantially greater than the width of the drawbar;

rear bracket structure connected near the aft end and projecting above the drawbar, the rear bracket structure comprising a pair of side members having lower ends connected to the drawbar and diverging in the upward direction to an upper pivot area, the upper pivot area supporting the aft end of the spring assembly, and wherein the side members have upright edges with generally transverse flanges for reducing the stresses at the edges; and wherein the drawbar comprises a tube of rectangular configuration, and further including a pair of transverse bushings connected to the aft end of the tube, and bolt structure for firmly securing the side members against the ends of the bushings.

16. The invention as set forth in claim 15 wherein the spring assembly includes a pair of compression springs supported in side-by-side relationship generally parallel to the tube, wherein the springs provide a maximum combined spring force of over 10,000 pounds acting to resist upward rocking of the tool supporting end from the field-working position.

17. The invention as set forth in claim 15 wherein the side members include central planar sections with offset bend locations, and wherein the flanges extend perpendicularly to the planar sections.

18. In an implement having a frame adapted for forward movement over a field, a standard for mounting on the implement frame for intermediate tillage depth operations, the standard comprising:

a support bracket adapted for connection to the frame, the support bracket having a lower end and an upper, rearwardly projecting end;

a drawbar pivotally connected to the lower end of the bracket for rocking about an axis transverse to the forward direction, the drawbar extending rearwardly from the axis to an aft end having a preselected width, and including a tool support connected to the aft end and extending downwardly to a lower tool supporting end;

an earth working tool connected to the tool supporting end;

a fore-and-aft extending spring assembly pivotally connected near its forward end to the upper rearwardly projecting end of the support bracket, the spring assembly having a width substantially greater than the width of the drawbar and having a maximum spring force of at least 10,000 pounds;

rear bracket structure connected near the aft end and projecting above the drawbar, the rear bracket structure comprising a pair of said members having lower ends connected to the drawbar and diverging in the upward direction to an upper pivot area, the upper pilot area supporting the aft end of the spring assembly, and wherein the side members have upright edges with generally transverse flanges for reducing the stresses at the edges, wherein the side members include central planar sections with offset bend locations, and wherein the flanges extend perpendicularly to the planar sections; and wherein the side members are formed from a flat metal blank, the blank including upper outwardly concave and lower outwardly convex edges for providing a gradually varying blank width, and wherein one of the bend locations is located adjacent a transition area between the concave and convex edges.

* * * * *